(12) United States Patent
Russo, Jr.

(10) Patent No.: US 6,391,204 B1
(45) Date of Patent: *May 21, 2002

(54) METHOD FOR THE SEPARATION OF ACID FROM SUGARS

(75) Inventor: Lawrence J. Russo, Jr., Birmingham, AL (US)

(73) Assignee: Controlled Environmental Systems Corporation, Birmingham, AL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/354,666

(22) Filed: Jul. 16, 1999

Related U.S. Application Data

(62) Division of application No. 09/042,587, filed on Mar. 17, 1998, now Pat. No. 5,968,362.
(60) Provisional application No. 60/054,676, filed on Aug. 4, 1997, now abandoned.

(51) Int. Cl.$^7$ ............................................... B01D 15/08
(52) U.S. Cl. ...................... 210/635; 210/656; 210/659; 127/37; 127/46.2; 127/46.3; 127/51
(58) Field of Search ........................... 127/46.2, 46.3, 127/30, 37, 51, 49, 55; 210/635, 656, 659, 198.2

(56) References Cited

U.S. PATENT DOCUMENTS

| | | | |
|---|---|---|---|
| 3,723,306 A | 3/1973 | Bridgeford et al. | 210/638 |
| 4,452,640 A | 6/1984 | Chen et al. | 127/37 |
| 4,522,726 A | 6/1985 | Berry et al. | 210/660 |
| 4,642,903 A | 2/1987 | Davies | 34/284 |
| 4,764,276 A | 8/1988 | Berry et al. | 210/264 |
| 5,084,104 A | 1/1992 | Heikkila et al. | 127/46.2 |
| 5,407,580 A | 4/1995 | Hester et al. | 210/635 |
| 5,407,817 A | 4/1995 | Lightsey et al. | 435/165 |
| 5,482,631 A | 1/1996 | Saska et al. | 210/635 |
| 5,506,123 A | 4/1996 | Chieffalo et al. | 439/139 |
| 5,538,637 A | 7/1996 | Hester et al. | 210/635 |
| 5,562,777 A | 10/1996 | Farone et al. | 127/37 |
| 5,571,703 A | 11/1996 | Chieffalo et al. | 435/105 |
| 5,580,389 A | 12/1996 | Farone et al. | 127/46.2 |
| 5,597,714 A | 1/1997 | Farone et al. | 435/100 |
| 5,620,877 A | 4/1997 | Farone et al. | 435/139 |
| 5,628,907 A | 5/1997 | Hester et al. | 210/635 |
| 5,651,895 A | 7/1997 | Gordon | 210/709 |
| 5,726,046 A | 3/1998 | Farone et al. | 435/100 |
| 5,779,164 A | 7/1998 | Chieffalo et al. | 241/17 |
| 5,820,687 A | 10/1998 | Farone et al. | 127/46.2 |

FOREIGN PATENT DOCUMENTS

| | | | |
|---|---|---|---|
| CL | 37451 | 2/1990 | 210/659 |

OTHER PUBLICATIONS

Fritz, J.S., "Principles and applications of ion–exclusion chromatography," *J. Chromat.* 546:111–118 (1991).

Morgart, J.R. amd Graaskamp, J.M., "Continuous Process Scale Chromatography," Paper No. 230, presented at the Pittsburgh Conference on Analytical Chemistry and Applied Spectroscopy Feb. 22, 1988, New Orleans, Louisiana, ii and 15 p.

Meyer, V.R., "Practical High–Performance Liquid Chromatrography," 2$^{nd}$ ed., John Wiley & Sons, New York, NY, pp. 86–99 and 323–368 (1994).

Unger, K.K. et al., "Bonded Silica Phases for the Separation of Biopolymers by Means of Column Liquid Chromatography," in High–Performance Liquid Chromatography: Advances and Perspectives, vol. 5, Horváth, C., ed., Academic Press, Inc., New York, NY, p. 1–93 (1988).

"Integrated Fuel Alcohol Production Systems for Agricultural Feedstocks, Phase III; Quarterly Technical Report for the Period Apr.–Jun. 1995." Submitted by Tennessee Valley Authority Office of Agricultural and Chemical Development, TVA Contract No. TV–540881 (1985).

English–language translation of Chilean Patent No. 37451 (Document AL1).

Co–pending U.S. application No. 09/354,665, filed Jul. 16, 1999.

Co–pending U.S. application No. 09/694,017, filed Oct. 23,2000.

*Primary Examiner*—Ernest G. Therkorn
(74) *Attorney, Agent, or Firm*—Sterne, Kessler, Goldstein & Fox P.L.L.C.

(57) ABSTRACT

A method for separating acid and sugars obtained from liquids resulting from the acid hydrolysis of a material containing at least one of cellulose and hemicellulose is disclosed, comprising adding the liquids to a separation unit comprising a bed of anionic exchange or exclusion chromatographic material whereby the acid is adsorbed onto the chromatographic material, thereby producing a series of first fractions comprising sugar solutions and a later series of fractions comprising acid solutions. A process for an economical, energy efficient production of ethanol from municipal solid waste and other cellulosic feedstocks is also disclosed.

11 Claims, No Drawings

METHOD FOR THE SEPARATION OF ACID FROM SUGARS

This application is a division of application Ser. No. 09/042,587, filed Mar. 17, 1998, now U.S. Pat. No. 5,968,362, pending, which claims the benefit of U.S. Provisional Appl. No. 60/054,676, filed Aug. 4, 1997, abandoned, the contents of each of which are fully incorporated by reference herein.

BACKGROUND OF THE INVENTION

1. Field of the Invention

The present invention relates to processes for the separation of acid from sugars obtained from the acid hydrolysis of cellulosic and/or hemicellulosic material. The present invention further relates to a method for removing the heavy metals associated with the acid/sugar solutions that are obtained from municipal solid waste (MSW) or sewage sludge which may contain cellulosic and/or hemicellulosic materials.

2. Related Art

U.S. Pat. No. 5,580,389 discloses methods for separating acids and sugars resulting from strong acid hydrolysis of biomass containing cellulose and hemicellulose. The cellulose and hemicellulose is first decrystallized and then hydrolyzed to produce a hydrolysate containing both sugars and acid. Silica present in the biomass can then be removed for further processing. The remaining solids are then subjected to a second decrystallization and hydrolyzation to optimize the sugar yields. A method for separating the sugars from the acid in the hydrolysate is also disclosed. The resultant sugar stream containing both hexoses and pentoses can then be fermented. In particular, the method of separating the sugars from the hydrolysate involves the use of a resin separation unit wherein the sugars are adsorbed on a strong acid resin. Liquids are then added to the resin and an acid stream containing less than 2% sugar is obtained.

U.S. Pat. Nos. 5,407,580 and 5,538,637 disclose a process for separating an ionic component such as acid from a nonionic component such as sugar in polar solutions using ion exclusion technology. In particular, the methods involve control of dispersion, caused by shrinkage of resin by acid within ion exchange columns. The continuous method employs an acid resin which is contacted with an acid-sugar solution whereby a first fraction comprises an enriched fraction of acid and later fractions comprise an enriched fraction of sugar.

U.S. Pat. Nos. 5,407,817 and 5,571,703 disclose methods of processing municipal solid waste to recover materials that may be recycled and to produce ethanol from the cellulosic component. One particular problem of municipal solid waste is the heavy metal component which may inhibit the fermentation of sugars by yeast or other fermentative microorganism. According to these patents, the heavy metals can be removed in any one of two different methods. In the "front end" process, the heavy metals are removed by treating the shredded cellulosic component with dilute sulfuric acid at about 40 to 100° C. to solubilize substantially the heavy metals. The insoluble component of the reaction mixture comprising the cellulose may then be recovered and processed to give ethanol. In the "back end" process, the shredded cellulosic component is directly hydrolyzed with concentrated sulfuric acid. After dilution with water and cooking at elevated temperatures, the insoluble lignin is removed. It was discovered that heavy metals were associated with the insoluble lignin which allows for the removal of the heavy metals from the sugar containing solution.

U.S. Pat. No. 5,651,895 discloses methods of removing heavy metals from certain waste waters by adding an iron salt, and then a base to increase the pH to a level of about 8 to 10. As the base is added, a precipitate containing the heavy metals is formed which is then removed by standard filtration techniques. The process can be carried out continuously or batch wise.

SUMMARY OF THE INVENTION

The invention relates to a method for separating acid and sugars obtained from liquids resulting from the acid hydrolysis of at least one of cellulosic and hemicellulosic materials, comprising adding the liquids to a separation unit comprising a bed of anionic exchange or exclusion chromatographic material whereby the acid is adsorbed onto the chromatographic material, thereby producing a series of first fractions comprising sugar solutions and a later series of fractions comprising acid solutions.

The present invention represents a significant departure compared to the prior art which employed a cationic resin to adsorb the sugar. In this prior art embodiment, the sugar was treated as the "product" of the separation and was obtained in relative high purity compared to the acid which eluted first from the resin. The acid fractions contained impurities as little or no fractionation of the acid occurred. In contrast, according to the present invention, the acid is adsorbed onto a bed of anionic exchange or exclusion chromatographic material which results in the acid eluting after the sugar has eluted from the bed. Thus, according to the present invention, the acid is treated as the product of the separation and is obtained in higher purity and concentration compared to when a cationic resin is employed. Since acid is much more expensive to concentrate (for recycling in the process) compared to sugar (for fermentation), the use of an anionic exchange or exclusion chromatographic material achieves a significant cost savings in terms of energy requirements and capital costs compared to when a cationic resin is employed.

Since the sugar is not retarded on the anionic exchange or exclusion chromatographic material, it elutes first and is contaminated by some acid and heavy metals. The heavy metal contamination may become significant when the cellulosic and/or hemicellulosic material is derived from MSW. In this embodiment, the residual acid and heavy metals may be removed from the combined sugar fractions by treatment with lime which both neutralizes the residual acid and precipitates the heavy metals to give gypsum containing the heavy metals.

Thus, the invention is also related to a method for separating acid and sugars obtained from liquids resulting from the acid hydrolysis of cellulosic and/or hemicellulosic materials and removal of residual acid and heavy metals from the resultant sugar solution, comprising (a) adding the liquids to a separation unit comprising a bed of anionic exchange or exclusion chromatographic material whereby the acid is adsorbed onto the chromatographic material, thereby producing a series of first fractions comprising sugar solutions and a later series of fractions comprising acid solutions; and (b) treating the sugar solutions with lime to neutralize any residual acid and precipitate the heavy metals that may be present in the combined sugar solutions.

The invention is also related to a method for separating acid and sugars obtained from liquids resulting from the acid hydrolysis of cellulosic and/or hemicellulosic materials and removal of residual acid and heavy metals from the resultant sugar solution, comprising (a) adding the liquids to a separation unit comprising a bed of anionic exchange or exclusion chromatographic material whereby the acid is adsorbed onto the chromatographic material, thereby producing a series of first fractions comprising sugar solutions and a later series of fractions comprising acid solutions;

(b) combining the first fractions comprising the sugar solutions; and (c) treating the combined sugar solutions with lime to neutralize any residual acid and precipitate the heavy metals that may be present in the combined sugar solutions.

The present invention provides for the continuous removal of heavy metals. The heavy metals contaminate both the acid and sugar fractions. Thus, a fraction of the heavy metals are contained in the acid fractions which are combined, concentrated and recycled. With repeated recycling of the acid and removal of a fraction of the heavy metals in the combined sugar solutions, a steady state concentration of heavy metals in the acid fractions will be achieved.

Thus, the invention also relates to a continuous method for removal of heavy metals from a sugar and acid solution, comprising (a) hydrolyzing a sample comprising heavy metals and cellulose and/or hemicellulose with concentrated acid to give a partially digested mixture;

(b) diluting the partially digested mixture with water (which may comprise raw sewage, septage, sewage sludge, waste water sludges, commercial waste streams and/or leachate from a land fill) and heating for a time sufficient to hydrolyze substantially the cellulose and/or hemicellulose to give a sugar/acid solution comprising heavy metals;

(c) adding the sugar/acid solution comprising heavy metals to a simulated moving bed separation unit comprising a bed of anionic exchange or exclusion chromatographic material whereby the acid is adsorbed onto the chromatographic material, thereby producing a series of first fractions comprising sugar solutions and a later series of fractions comprising acid;

(d) combining the first fractions comprising the sugar solutions;

(e) treating the combined sugar solutions with lime to neutralize any residual acid and precipitate the heavy metals that may be present in the combined sugar solutions; and (f) combining and concentrating the fractions containing acid.

The advantages of the present invention are manifold;

(1) The acid concentration of the combined acid fractions is higher (about 8–16%, more preferably 10–16%) compared to when a cationic exchange resin is used (about 4.5–7%), which lowers the size, cost, energy consumption and overall operating costs of the acid evaporator which concentrates the acid and recycles it in the process. Besides an acid evaporator, the acid may also be concentrated by other methods such as electrodialysis and extraction.

(2) There is less sugar in the acid fractions compared to when a cationic exchange resin is used, which results in less fouling in the acid evaporator and higher sugar recovery.

(3) There is more acid in the sugar containing fractions, which allows for the recovery of the heavy metals and neutralization of pH by addition of lime.

(4) Although the sugar concentration is lower (about 3–9%, more preferably 5–9%) compared to when a cationic exchange resin is used (about 8–14%, more preferably 10–14%), the concentration of the sugar solution can easily be achieved with a reverse osmosis unit or by evaporation. Since concentration of the sugar solution is necessary even when a cationic exchange resin is employed, the additional concentration necessitated by use of an anion exchange or exclusion chromatographic material does not increase significantly the capital or operating cost of the process.

Surprisingly, the aforementioned process allows for the highly efficient and cost effective production of ethanol from cellulose and hemicellulose containing material, e.g. sewage sludge and/or municipal solid waste.

DESCRIPTION OF THE PREFERRED EMBODIMENTS

In the practice of the invention, the feed stock may be any cellulosic or hemicellulosic containing material such as biomass including yard waste, agricultural residue, agricultural waste, switch grass, leaves, corn stover, hybrid poplars and the like, waste paper, shredded paper or cardboard, paper sludge, paper pulp fines and the like, wood chips, saw dust or MSW, including waste obtained directly from a municipality or municipal solid waste that was previously land-filled and subsequently recovered and any combination thereof. In addition to municipal solid waste, the feed stock can contain sewage sludge, septage sludge, and waste water sludges, preferably in the form of sewage sludge cake which may contain amounts of cellulosic material, or sewage sludge that has been acidified with the acid obtained from the sugar-acid separator (e.g., via the wash water from the secondary "lignin" filters). Acidification of the sewage sludge helps keep it in solution or suspension and helps to reduce the microbial activity and, thus, the odor of the acidified material.

The waste cellulosic and hemicellulosic material is admitted into the facility through a fully automated receiving station. The waste material is then dumped onto a bulk conveyor. Any recyclable materials present such as valuable bulk items, ferrous metals, non-ferrous metals such as aluminum, glass, plastic, and rubber and the like may then be recovered. Methods for recovering such items are well known and disclosed, for example, in U.S. Pat. Nos. 5,184,780, 5,104,419, 5,060,871, 5,009,672, 4,974,781, 4,874,134, 4,692,167, 4,553,977, 4,541,530, 4,341,353, 4,069,145, and 4,063,903.

Preferably, any scrap tire materials are segregated onto a separate bulk conveyor which leads to a scrap tire processing and rubber recovery system, where the scrap tires are shredded and the rubber, steel and fiber are removed.

A remote controlled crane is used to remove any oversized, bulky or other materials from the solid waste conveyor. These oversized materials may be further processed for size reduction. The material is then sent to a recycling bin for bulk handling.

The waste material remaining after the oversized material is removed is then classified by the use of a trommel or other screening mechanism which disrupts any bags and yields two separate processing streams. By appropriate classification, one stream contains organic waste composed primarily of cellulosic and hemicellulosic material, while the other contains metallic products of a particular size, plastic, glass and rubber.

The waste materials may be processed through several magnetic separations to remove any ferrous metals. The waste is then passed through an eddy current separator to remove any non-ferrous metals. The ferrous and non-ferrous metals are both conveyed to bins to await baling. The organic waste is then shredded and processed in the ethanol production system which accepts the waste material and processes it to obtain ethanol.

When sewage sludge is used, it may first be dewatered to obtain a sewage sludge cake. Methods of dewatering sewage sludge to obtain sewage sludge cakes are well known in the art. For example, the moisture content of sewage sludge can be reduced by vacuum filters to 75–85% moisture, to obtain a sewage sludge cake. Since sewage sludge cakes will normally not contain substantial amounts of recyclable materials (aluminum, glass, plastics, etc.), they can be directly hydrolyzed and processed in the ethanol production system. However, if necessary, further drying of the sewage sludge cake can be achieved by flash or spray drying, where the sewage sludge cake particles are dried in suspension in a stream of hot gases to provide almost instantaneous removal of excess moisture. Rotary dryers and indirect heating systems can also be used. These drying techniques typically comprise a pug mill, rotary kiln dryer, dry cyclone and a web-scrubber. The aforementioned drying techniques are disclosed in Sludge Digestion and Disposal, *Public Works* 125 (5):D47–D58 (1994).

A portion of the byproducts from the ethanol process may be sold commercially. To aid in the operation of the plant, a portion of the byproducts may also be burned to cogenerate electricity, to produce heat for evaporation, or to produce heat for waste drying. For example, the insoluble material obtained after hydrolysis of the cellulosic and/or hemicellulosic material is primarily composed of lignin, a natural aromatic organic polymer found in all vascular plants. When the lignin is burned as a boiler fuel, the total energy costs for operating the processing facility can be significantly decreased. See U.S. Pat. No. 5,571,703. Furthermore, the non-chlorinated plastic component of MSW may also be burned. A technology capable of separating non-chlorinated plastic from chlorinated plastic (e.g. PVC), known as Vinyl Cycle™, is commercially available from National Recovery Technologies, Nashville, Tenn. The Vinyl Cycle™ technology is disclosed in U.S. Pat. No. 5,260,576. This composite lignin/plastic material can also be burned as a boiler fuel, thereby further decreasing the energy costs of the disclosed ethanol production process.

Any non-organic materials remaining after the aforementioned screening process may be pelletized and used commercially as additives for construction materials.

The process of the present invention may be entirely automated, requiring only routine maintenance at the end of each shift of operation. Fully automated screening techniques eliminate the need for unsanitary, hand sorting.

The materials that are not treatable are hazardous waste, explosives and infectious wastes. The system is able to handle refrigerators, washers, dryers, ranges, automobile scrap metal, large materials, small industrial waste and standard municipal solid waste. The present system is designed to recover white goods, plastics, glass, rubber, ferrous metals, and non-ferrous metals from the solid waste.

The level of heavy metals found in the cellulosic component of sewage sludge (and cakes composed thereof) or MSW can vary significantly depending upon the source of the waste. For instance the hydrolyzate generated from the cellulosic component of MSW obtained from urban or highly industrialized areas may be contaminated with heavy metals to an extent that it may inhibit the subsequent yeast fermentation process. Therefore, these types of MSW samples must be processed to reduce the heavy metal content prior to fermentation.

Methods for the acid hydrolysis of hemicellulose and cellulose-containing materials to obtain acid/sugar solutions are well known and disclosed, for example, in U.S. Pat. Nos. 5,407,817, 5,407,580, 5,538,637, 5,562,777, 5,571,703, 5,580,389, 5,597,714 and 5,620,877, the contents of which are incorporated by reference herein in their entirety.

The following discussion describes three processes which can be utilized to reduce the heavy metal content of the cellulose and/or hemicellulose component of the feed stock. One reduces the heavy metal content prior to hydrolyzation, and the other two after hydrolyzation. Which process is used can be determined based upon the level of heavy metal contamination found in the feedstock.

The "front end" process separates the heavy metals that may inhibit fermentation of the sugars by mixing the incoming shredded cellulosic and/or hemicellulosic material with dilute sulfuric acid and then heating the mixture. The solids are then pressed and the liquids are treated with lime, creating a byproduct, gypsum. The gypsum is then removed and the remaining solids are prepared to be broken down into sugars in the hydrolysis system. This "front end" process is described in detail in U.S. Pat. No. 5,571,703.

An alternative process is the "back end" process for removing much of the heavy metals which involves carrying out the hydrolyzation step and recovering the aqueous-insoluble lignin. It has been discovered that much of the heavy metals are bound to the lignin. The lignin can then be burned directly or first pretreated with a concentrated salt solution to elute the heavy metals for disposal. This "back end" process is described in detail in U.S. Pat. No. 5,571,703.

A third process for recovering the heavy metals involves hydrolyzing the cellulosic and/or hemicellulose material with concentrated acid (e.g. concentrated sulfuric acid), separating the acid from the sugars with an anionic exclusion resin, and collecting the initial fractions comprising the sugar, heavy metals and a small amount of acid. Methods for the continuous separation of acids and sugars using continuous ion exclusion chromatography with a rotating resin bed are described in U.S. Pat. Nos. 5,580,389, 5,407,580, 5,538, 637, and 5,571,703. In the present process, an anionic exchange or exclusion chromatographic material is substituted for the cationic resin described in the aforementioned patents.

Examples of anionic exchange or exclusion chromatographic materials that can be used in the process of the present invention include chromatographic materials having tertiary ammonium groups, quaternary ammonium groups or polyamine groups. The anionic functional groups may be attached to a variety of materials (see, e.g., V. R. Meyer, *Practical High-Performance Liquid Chromatography*, 2nd ed., 1994, John Wiley & Sons, New York, Appendix 3, p. 323) including, inter alia, polymers (i.e., resins) such as polystyrene-divinylbenzene, hydroxyalkylmacrolate, vinylalcohol copolymer, and agarose. The anionic functional groups may also be attached to silica (K. K. Unger, et al., "Bonded Silica Phases for the Separation of Biopolymers by Means of Column Liquid Chromatography," *High-Performance Liquid Chromatography, Advances and Perspectives*, 1988, Academic Press, New York, Vol. 5, p. 17). Stability of the bonded phase and pH stability may be improved by first treating the porous silica particles with polysiloxanes (H. Engelhard, et al., 1989, Chromatographia, Vol. 27, p. 535 and U.S. Pat. No. 5,203,991). Additional materials to which anionic functional groups might also be attached include, inter alia, controlled-pore glass and porous graphitic carbon (V. R. Meyer, *Practical High-Performance Liquid Chromatography*, 2nd ed., 1994, John Wiley & Sons, New York, p. 98).

Ion exclusion is a separation mechanism which may also take place with ion exchange chromatographic materials (J. S. Fitz, J. Chromatography, 1991, Vol. 546, p. 111). During ion exclusion the ionic functional groups on the exchange material repel ions of the same charge so that they do not enter the pore system of the exchange material and are not thereby retarded. Compounds which do enter the pore system are separated by size exclusion chromatography, depending upon the pore diameters. When polystyrene-divinylbenzene is used, mechanical stability increases with increasing percentage of the divinylbenzene cross-linking agent (V. R. Meyer, *Practical High-Performance Liquid Chromatography*, 2nd ed., 1994, John Wiley & Sons, New York, p. 96). However, the resultant simplification in the pore structure results in decreased retention times for small molecules such as glucose (see, e.g., U.S. Pat. No. 5,407,580).

Specific examples of anionic exchange or exclusion resins that may be used include DEAE SEPHADEX, QAE SEPHADEX, DEAE SEPHAROSE, DEAE-TRISACRYL PLUS, DEAE SEPHACEL, DEAE CELLULOSE, EXPRESS-ION EXCHANGER D, ECTEOLA CELLULOSE, PEI CELLULOSE, QAE CELLULOSE, EXPRESS ION EXCHANGER Q, which are available from Sigma-Aldrich Corporation, St. Louis, Mo., BIORAD AG-1X2, BIORAD AG-1X1, BIORAD AG-1X4, BIORAD AG-21K, BIORAD AG-1X8, BIORAD AG-1X10, BIO-RAD AG-2X4, BIORAD AG-2X8, BIORAD AG-2X10, BIOREX 9, AMBERLITE IRA-900, AMBERLITE IRA-938-C, AMBERLITE A-26, AMBERLITE IRA-400, AMBERLITE IRA-401S, AMBERLITE IRA-401, AMBERLITE IRA-400C, AMBERLITE IRP-67, AMBERLITE IRP-67M, AMBERLITE IRA-410, AMBERLITE IRA-910, DOWEX 1X2, DOWEX 1X4, DOWEX 21K, DOWEX MSA-1, DOWEX 1X8, DOWEX SBR, DOWEX 11, DOWEX MSA-2, DOWEX SAR, DOWEX 2X4, DUO-LITE ES-111, DUOLITE A101D, IONAC A-540, IONAC A-544, IONAC A-548, IONAC A-546, IONAC A-550, IONAC A-5, IONAC A-580, IONAC A-590, IONAC A0000, QAE SEPHADEX A-25, QAE SEPHADEX A-50, DIAION TYPE I and DIAION TYPE II strong base anion exchangers. Preferable strong base anion exchange resins include AMBERLITE IRP-67, BIORAD AG-1X10, BIO-RAD AG-1X8 and DOWEX 1X8. More preferred is AMBERLITE IRP-67M. Most preferred is Purolite A600. Specific examples of anion exchange or exclusion silica-based chromatographic materials that may be used include Absorbosphere SAX, Baker Quaternary Amine, Bakerbond Quaternary Amine, Nucleosil SB, Partisil SAX, Progel-TSK DEAE-3SW, Progel-TSK DEAE-2SW, Sepherisorb S SAX, Supelcosil SAX1, Ultrasil-AX, and Zorbax SAX.

A simulated moving bed apparatus which allows for the continuous separation of acid and sugar containing streams is commercially available from Advanced Separation Technologies Incorporated, Lakeland, Fla. (Models LC1000 and ISEP LC2000), and Illinois Water Treatment (IWT), Rockford, Ill. (ADSEP system; see Morgart and Graaskamp, Paper No. 230, *Continuous Process Scale Chromatography*, The Pittsburgh Conference on Analytical Chemistry and Applied Spectroscopy, New Orleans, Feb. 22, 1988), both of which employ ion exclusion resins. Such apparatuses are disclosed, for example, in U.S. Pat. Nos. 4,522,726 and 4,764,276. See also U.S. Pat. Nos. 5,407,580, 5,538,637, 5,580,389 and 5,571,703, for methods of separating sugars from acid in solution by continuous ion exclusion chromatography.

The temperature of the separation may range from room temperature to about 80° C. Preferably, the temperature of the separation is at about 60° C. Elevated temperatures may be achieved by placing a heating jacket around the separation unit and monitoring the temperature with a thermocouple.

In a preferred embodiment, the sugar stream obtained from this separation processes contains residual acid. The residual acid is neutralized with a base such as lime (to produce gypsum) or ammonia to a pH of about 6. When the cellulosic material is derived from MSW, it may contain substantial quantities of heavy metals that should be removed prior to fermentation. In this embodiment, it is preferred that the early sugar-containing fractions be treated with lime to both neutralize the pH and precipitate the heavy metals.

In this process, a fraction of the heavy metals wind up in the sugar containing fraction, another fraction is bound to the lignin, and the remaining fraction is in the acid containing fractions. These acid containing fractions are combined and concentrated, and recycled in the acid hydrolysis reaction. The amount of heavy metals will increase upon recycling, and will reach a steady state level dependent upon the level of heavy metals removed as part of the lignin and gypsum.

Alternatively, the heavy metals may be removed from the solution by treatment with an iron salt, adding a base to the solution to increase the pH to about 8 to 10, and removal of the precipitate containing the heavy metals according to U.S. Pat. No. 5,651,895. Bases which can be used for this purpose include any alkaline earth metal oxide or hydroxide such as calcium or magnesium oxide or hydroxide.

After separation of the sugar from the acid, the chromatographic bed is washed with water to remove residual acid and other contaminants. Guard columns may be used to protect the chromatographic beds from contamination by particulate matter. Inactive chromatographic material removed from the chromatographic beds may be used in the guard columns. As the guard columns become fouled, they may be taken off line, back-washed, and returned to service. This step could be automated, with the switching and back-wash cycles being controlled by the pressure drop across the guard columns. After washing and decontamination, the chromatographic bed is then ready for another separation process. When a "simulated moving resin bed" apparatus is employed, the separation process may be carried out continuously.

The simulated moving bed technique is a method of countercurrent chromatography that avoids the difficulties of moving solid adsorbent media. This is accomplished by sequencing the inlet (feed and desorbent) and the outlet (product and by-products) ports along a fixed bed of media that is separated into sections by distributors that allow liquid to flow into or out of each section. An external recycle pump continuously recirculates the liquid through the multi-section column, while the inlet and outlet ports sequence around the system in the same direction as the liquid flow. This gives the separation media a simulated flow in the opposite direction of the liquid flow.

For example, continuous separation of a mixture of acid and sugar, where acid is more highly adsorbed to the chromatographic material than sugar, may be initiated by introducing the mixture into one of the column sections. A separation will occur with the sugar traveling ahead of the acid. As the sugar travels downstream into the next column section, the feed introduction point is sequenced to the next downstream column section thereby maintaining purified sugar downstream and purified acid upstream of the feed introduction point. At a point several column sections upstream of the feed introduction point, eluant is introduced to remove the acid from the media.

Although all of the flows are in a single direction, the adsorbed acid travels backwards relative to the feed introduction point which is moving forward faster than the purified acid. Therefore, the acid is removed at a point upstream of the feed point and downstream of the eluant introduction point, while the sugar is removed downstream of the feed point and upstream of the eluant introduction point.

The result is that the media will "move" in the opposite direction of the liquid flow with respect to the inlet and outlet ports. With this system, a chromatographic separation profile may be maintained and recirculated throughout the adsorption media. This profile may be optimized to produce a high purity product and a high purity by-product stream with a minimum of dilution. See Morgart and Graaskamp, Paper No. 230, *Continuous Process Scale Chromatography*, The Pittsburgh Conference on Analytical Chemistry and Applied Spectroscopy, New Orleans, Feb. 22, 1988).

After the separated sugar solution is neutralized and the heavy metals removed, the sugar solution is then concentrated and blended with yeast for the production of an ethanol/water solution. Compared to the use of a cationic exchange resin, the sugar solution obtained after separation on an anionic exchange or exclusion chromatographic material is more dilute and must first be concentrated. The sugar solution may be concentrated to about 10–22%, more preferably about 12–22%. This may be accomplished by evaporation, e.g., by application of heat and/or a vacuum. In order to avoid heat induced decomposition of the sugar and to improve the economics of the process, it is preferable to use a reverse osmosis membrane or filter to concentrate the solution. Reverse osmosis has a theoretical upper limit of 18% and a reasonable operational range of 15 to 16%. Such reverse osmosis membranes or filters are available from sources such as Dow Chemical (Midland, Mich.), Du Pont (Wilmington, Del.), Millipore (Bedford, Mass.), Monsanto (St. Louis), Amicon (Danvers, Mass.), and Culligan (Northbrook, Ill.).

Any one of a number of known yeast or bacteria may be used to convert the sugar to ethanol, depending on whether there are $C_5$ and/or $C_6$ sugars present in the solution. Examples of such organisms may be found in U.S. Pat. Nos. 5,198,074, 5,135,861, 5,036,005, 4,952,503, 4,650,689, 4,384,897, 4,288,550 and 5,580,389. A preferred organism is *E. coli* containing the Zymonas PDC and ADH genes described in U.S. Pat. No. 5,000,000, which is capable of fermenting both $C_5$ and $C_6$ sugars to give ethanol. When the cellulosic material is derived from MSW, the sugars are predominantly $C_6$ sugars which may be fermented with commonly available baker's or brewer's yeast. Ammonia and yeast nutrients may be added and the pH carefully monitored to ensure the required pH balance of about 6 for optimal fermentation.

After fermentation, the ethanol is recovered. The yeast may or may not be removed prior to recovery of the ethanol. The ethanol may be recovered by distillation or, in the alternative, may be recovered by solvent extraction with a solvent which is non-toxic to the fermentation microorganisms. See, U.S. Pat. No. 5,036,005. The yeast may also be removed by centrifugation. See, U.S. Pat. No. 4,952,503. Preferably, the remaining yeast is first removed and the fermented liquid is pumped to a distillation column for the extraction of ethanol.

Alternatively, the sugar may be fermented to lactic acid. See U.S. Pat. Nos. 5,503,750 and 5,506,123. Other potential fermentation products of glucose include organic acids, such as citric, acetic, formic, malic and succinic acid; alcohols such as propanol, isopropanol, butanol, and glycerol may also be produced (in addition to ethanol). Additional products obtained from the fermentation of glucose are possible depending on the fermentation method and substrates employed, e.g., enzymes, amino acids, antibiotics and proteins. These fermentations are well documented in the art. See, e.g., Bernard Atkinson and Ferda Mavituna, Biochemical Engineering and Biotechnology Handbook, New York, N.Y., Nature Press (1983).

Having now fully described this invention, it will be understood by those of ordinary skill in the art that it can be performed within a wide equivalent range of modes of operation as well as other parameters without affecting the scope of the invention or any embodiment thereof. All publications, patent applications and patents disclosed herein are incorporated by reference in their entirety.

What is claimed is:

1. A method for separating acid and sugars obtained from liquids resulting from the acid hydrolysis of a material containing at least one of cellulose and hemicellulose, comprising adding the liquids to a separation unit comprising a bed of strong basic anionic exchange or exclusion chromatographic material whereby the acid is adsorbed onto the chromatographic material, thereby producing a series of first fractions comprising sugar solutions and a later series of fractions comprising acid solutions.

2. The method of claim 1, wherein said sugar solutions are contaminated by acid and heavy metals.

3. The method of claim 2, further comprising (b) combining the sugar solutions.

4. The method of claim 3, further comprising (c) removing the residual acid and heavy metals from the combined sugar solution by treatment with lime, thereby neutralizing the acid and precipitating the heavy metals to give gypsum containing the heavy metals.

5. The method of claim 1, wherein said acid is sulfuric acid.

6. The method of claim 1, wherein said chromatographic material is an ion-exclusion resin.

7. A method for separating acid and sugars obtained from liquids resulting from the acid hydrolysis of at least one of cellulosic and hemicellulosic materials and removal of residual acid and heavy metals from the sugar, comprising (a) adding the liquids to a separation unit comprising a bed of strong basic anionic exchange or exclusion chromatographic material whereby the acid is adsorbed onto the chromatographic material, thereby producing a series of first fractions comprising sugar solutions and a later series of fractions comprising acid solutions; and (b) treating the sugar solutions with lime to neutralize any residual acid and precipitate the heavy metals that may be present in the combined sugar solutions.

8. The method of claim 7, wherein the sugar solutions are combined before being treating with lime.

9. The method of claim 7, wherein said acid is sulfuric acid.

10. The method of claim 7, wherein said at least one of cellulosic and hemicellulosic materials are derived from MSW.

11. The method of claim 7, wherein in step (a), the chromatographic material is an ion-exclusion resin.

* * * * *